(12) United States Patent
Liu et al.

(10) Patent No.: US 11,080,457 B1
(45) Date of Patent: Aug. 3, 2021

(54) LAYER ASSIGNMENT AND ROUTING BASED ON RESISTANCE OR CAPACITANCE CHARACTERISTIC

(71) Applicant: Cadence Design Systems, Inc., San Jose, CA (US)

(72) Inventors: Derong Liu, Austin, TX (US); Yi-Xiao Ding, Austin, TX (US); Mehmet Can Yildiz, Austin, TX (US); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/823,093

(22) Filed: Mar. 18, 2020

(51) Int. Cl.
| G06F 30/394 | (2020.01) |
| G06F 30/392 | (2020.01) |
| G06F 30/31 | (2020.01) |
| G06F 30/327 | (2020.01) |
| G06F 119/12 | (2020.01) |

(52) U.S. Cl.
CPC ............ *G06F 30/394* (2020.01); *G06F 30/31* (2020.01); *G06F 30/327* (2020.01); *G06F 30/392* (2020.01); *G06F 2119/12* (2020.01)

(58) Field of Classification Search
CPC .... G06F 30/398; G06F 30/367; G06F 30/394; G06F 30/392; G06F 2111/20; G06F 2119/12; G06F 30/30; G06F 30/31; G06F 30/3312; G06F 30/327
See application file for complete search history.

(56) References Cited

U.S. PATENT DOCUMENTS

| 6,292,928 | B1 * | 9/2001 | Yamaguchi | G06F 30/394 716/113 |
| 6,381,730 | B1 * | 4/2002 | Chang | G06F 30/367 716/134 |
| 6,609,241 | B2 * | 8/2003 | Yonemori | G06F 30/394 716/114 |
| 6,760,895 | B2 * | 7/2004 | Ito | G06F 30/394 716/113 |
| 6,925,619 | B2 * | 8/2005 | Teng | G06F 30/398 716/115 |
| 7,353,469 | B2 * | 4/2008 | Ogawa | G06F 30/367 716/115 |
| 7,962,320 | B2 * | 6/2011 | Ogawa | G06F 30/367 703/13 |
| 7,984,406 | B2 * | 7/2011 | Akamine | G01R 31/3016 716/115 |
| 8,516,425 | B2 * | 8/2013 | Nikitin | G06F 30/327 716/115 |

(Continued)

*Primary Examiner* — Helen Rossoshek
(74) *Attorney, Agent, or Firm* — Schwegman Lundberg & Woessner, P.A.

(57) ABSTRACT

Various embodiments provide for layer assignment of a network of a circuit design based on a resistance or capacitance characteristic, such as a resistance/capacitance characteristic associated with a layer, a wire, or a via of the circuit design. In particular, various embodiments consider a resistance/capacitance characteristic of a layer, a wire, or a via of a circuit design to determine a set of layers for routing one or more networks of the circuit design, which can enable some embodiments to route the networks on the layers within a certain range that has very close resistance/capacitance (RC) characteristics, and can permit routing each network on layers having the smallest RC characteristic difference.

19 Claims, 9 Drawing Sheets

(56) References Cited

U.S. PATENT DOCUMENTS

| | | | | |
|---|---|---|---|---|
| 8,667,450 | B2* | 3/2014 | Wang | G06F 30/398 |
| | | | | 716/136 |
| 8,782,577 | B2* | 7/2014 | Fischer | G06F 30/39 |
| | | | | 716/100 |
| 9,003,344 | B2* | 4/2015 | Kennedy | G06F 30/398 |
| | | | | 716/110 |
| 9,092,591 | B2* | 7/2015 | Alpert | G06F 30/327 |
| 10,579,767 | B1* | 3/2020 | Li | G06F 30/394 |
| 10,762,259 | B1* | 9/2020 | Ershov | G06F 30/39 |
| 10,860,764 | B1* | 12/2020 | Ding | G06F 30/337 |
| 2014/0113828 | A1* | 4/2014 | Gilbert | H01L 39/225 |
| | | | | 505/100 |
| 2016/0283643 | A1* | 9/2016 | Kim | G06F 30/398 |
| 2018/0314771 | A1* | 11/2018 | Lee | G06F 30/398 |
| 2018/0331095 | A1* | 11/2018 | DeLaCruz | H01L 25/0657 |
| 2019/0065656 | A1* | 2/2019 | Chakraborty | G06F 30/394 |
| 2019/0245543 | A1* | 8/2019 | Lee | G11C 11/412 |
| 2019/0258775 | A1* | 8/2019 | Kim | G06F 30/398 |
| 2020/0294858 | A1* | 9/2020 | DeLaCruz | H01L 24/49 |

\* cited by examiner

LAYER ASSIGNMENT AND ROUTING BASED ON RESISTANCE OR CAPACITANCE CHARACTERISTIC

TECHNICAL FIELD

Embodiments described herein relate to circuit design and, more particularly, to systems, methods, devices, and instructions for layer assignment and routing of a network of a circuit design based on a resistance or capacitance characteristic, which may be part of electronic design automation (EDA).

BACKGROUND

Electronic design automation (EDA) is a category of systems for assisting with the design of electronic systems and devices. Traditional EDA systems include layer assignment with respect to a circuit design, whereby a network (e.g., clock network) of the circuit design (or a portion thereof of the network) is assigned a specific layer of the circuit design for routing. For example, given a two-dimensional global routing tree for a circuit design, layer assignment of the circuit design can divide the 2D global routing tree into a list of nodes and can assign those nodes onto routing layers.

BRIEF DESCRIPTION OF THE DRAWINGS

Various ones of the appended drawings merely illustrate various embodiments of the present disclosure and should not be considered as limiting its scope.

DETAILED DESCRIPTION

Figure 1:
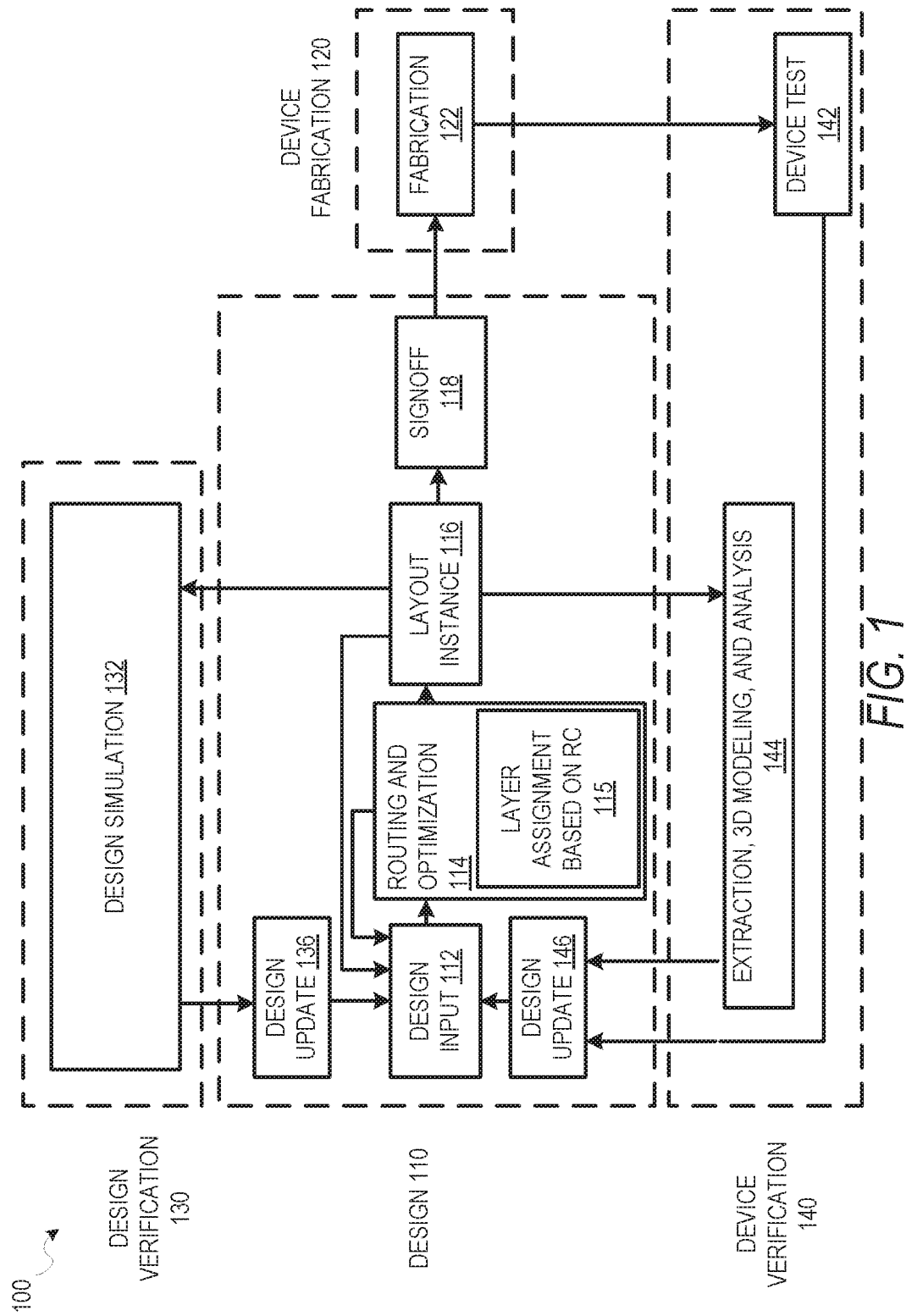
FIG. 1 is a diagram illustrating an example design process flow for layer assignment of a network of a circuit design based on a resistance characteristic or a capacitance characteristic, according to some embodiments.

At present, conventional routing and layer assignment processes do not consider resistance or capacitance characteristics when routing a clock network (or a clock net) and, as a result, conventional routing and layer assignment tends to route clock nets on layers with huge resistance or capacitance differences. Unfortunately, huge resistance or capacitance differences can affect the timing closure of a circuit design, as timing of the circuit design is dependent on both wirelength and resistance/capacitance (RC) values, and wirelength/RC values can cause timing issues in the circuit design by grouping layers of the circuit design with huge resistance or capacitance differences for clock network routing.

Various embodiments provide for layer assignment of a network of a circuit design based on a resistance characteristic or a capacitance characteristic, such as a resistance/capacitance characteristic associated with a layer, a wire or a via of the circuit design. In particular, various embodiments consider a resistance/capacitance characteristic of a layer, a wire, or a via of a circuit design to determine a set of layers for routing one or more networks of the circuit design (e.g., clock networks), which can enable some embodiments to route the networks on the layers within a certain range that has very close RC characteristics, and can permit routing each network on layers (e.g., of preferred layers) having the smallest RC characteristic difference. This in turn can cause the circuit design to achieve a better timing result with higher layer adherence.

Some embodiments attempt to route a network of a circuit design on one or more layers within a certain range that have close resistance characteristics, capacitance characteristics, or both. To do so, some embodiments approximate a layer range for a group of networks of a circuit design based on their respective timing requirement, where the layer range of the group comprises a set of layers with close resistance or capacitance characteristic (e.g., characteristic value within a difference threshold). This can enable each network of a circuit design to be assigned to layers with a smallest RC characteristic difference. In doing so, various embodiments described herein can achieve better timing for the circuit design with higher layer adherence.

After performing an initial routing process on a circuit design, various embodiments determine a wider layer range for non-routed networks of a circuit design based on a resistance value, a capacitance value, or both. For instance, for each network of a circuit design, an embodiment can determine a layer assignment of wires of the network with an improved resistance value or an improved capacitance value. An embodiment can also consider a via count, congestion, and the like. In this way, various embodiments can determine a routing solution having a better timing compared to a routing solution determined by a conventional methodology.

From a high level, various embodiments access data describing one or more networks of a circuit design, and resistance-capacitance (RC) characteristics of layers of the circuit design. Based on the data, embodiments can divide layers of the circuit design into layer groups (e.g., metal layers M1 through M2 form a first layer group, metal layers M3 through M4 form a second layer group, and metal layers M5 through M6 form a third layer group) based on the RC characteristics of the layers. Thereafter, for each individual layer group, two-dimensional topologies for networks associated with that individual layer group are determined (e.g., developed or generated), and those networks are assigned to one or more layers within a layer range of the individual layer group, or both, within a layer range enlarged based on a resistance characteristic, or a capacitance characteristic. Subsequently, a circuit design layout can be generated based on the resulting routed networks.

By use of some embodiments, timing metrics, such as reducing slew delay, reducing insertion delay, and timing closure, of a circuit design can be improved. Additionally, use of some embodiments can improve layer adherence within a circuit design.

As used herein, a resistance value can numerically represent a resistance characteristic, and a capacitance value can numerically represent a capacitance characteristic.

As used herein, global routing can comprise determining a routing plan (e.g., one or more routing guides) for routing a physical wire (e.g., interconnect line or wire) within a circuit design between two or more nodes of the circuit design (e.g., two pins or a source and a pin). For instance, global routing can route a wire (of a net of the circuit design) within the circuit design by dividing the circuit design (e.g., dividing each of one or more layers of the circuit design) into a grid of cells (e.g., grid cells), where each cell comprises a set number of resources (e.g., horizontal and vertical resources, such as tracks) for routing the wire. For some embodiments, each layer of a circuit design comprises its own grid of cells (e.g., grid cells). Global routing can consider/account for one or more routing blockages of the circuit design when determining a route plan for a wire within the circuit design.

Global routing can route a wire (of the net) by assigning the net to a set of specific cells and a set of specific layers (metal layers) of the circuit design. In doing so, global routing can generate a routing plan for the wire that describes a set of connected cells (e.g., grid cells), between two or more nodes of the circuit design, that does not include obstructed cells. The routing plan (e.g., global routing plan) can comprise one or more routing guides that serve as "loose" routing paths or routing areas within which detailed routing can route a physical wire between two or more nodes (e.g., pins) of a circuit design.

As used herein, detailed routing can comprise routing a physical wire (e.g., interconnect wire) within a circuit design, between two or more nodes of the circuit design, based on a routing plan determined by global routing for the circuit design. The routing plan can provide a detailed routing process with a topology for routing wires, which in turn can enable detailed routing to route wires without violating one or more design rule constraints (DRCs) associated with a circuit design. This can be referred to as detailed routing being performed with clean DRCs. Accordingly, for some embodiments, global routing is performed on a circuit design prior to detailed routing being performed on the circuit design. Generally, global routing can be performed on a circuit design faster than detailed routing can be performed on the same circuit design. The routed wires of a circuit design can form a network of the circuit design.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a diagram illustrating an example design process flow 100 for layer assignment of a network of a circuit design based on a resistance characteristic or a capacitance characteristic, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. The routing and optimization 114 operation may also include other operations not shown, such as those relating to floorplanning, placement, post-placement optimization, and post-routing optimization. As shown, the routing and optimization 114 operation includes a layer assignment based on resistance-capacitance (RC) 115 operation (hereafter, the layer assignment 115 operation), which may be performed in accordance with various embodiments described herein. For some embodiments, a layer assignment 115 operation can be performed prior to detailed routing of a circuit design, during (e.g., as part of) global routing of the circuit design, or between global routing and detailed routing of the circuit design.

While the design process flow 100 shows optimization occurring prior to a layout instance 116, timing analysis and optimization may be performed at any time to verify operation of a circuit design. For instance, in various embodiments, timing analysis in a circuit design may be performed prior to routing of connections in the circuit design; after routing, during register transfer level (RTL) operations; or as part of a signoff 118, as described below.

Design inputs are used in the design input 112 operation to generate an initial circuit layout. The design inputs may be further processed during the design input 112 operation via a process, such as logic-synthesis, to generate a circuit netlist mapped to a target standard library manufacturable by the foundry in a fabrication 122 operation. After design inputs are used in the design input 112 operation to generate an initial circuit layout, and any of the routing and optimization 114 operations are performed, a resulting layout is generated as the layout instance 116. The netlist as placed by the layout instance 116 describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations and layout modifications generated based on actual device performance.

As described in more detail below, a design update 136 from the design simulation 132 operations; a design update 146 from the device test 142 operations or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

FIGS. 2 through 5 are flowcharts illustrating example methods for layer assignment of a network of a circuit design based on a resistance characteristic or a capacitance characteristic, according to some embodiments. It will be understood that example methods described herein may be performed by a device, such as a computing device executing instructions of an EDA software system, in accordance with some embodiments. Additionally, example methods described herein may be implemented in the form of executable instructions stored on a computer-readable medium or in the form of electronic circuitry. For instance, the operations of a method 200 of FIG. 2 may be represented by executable instructions that, when executed by a processor of a computing device, cause the computing device to perform the method 200. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Figure 2:
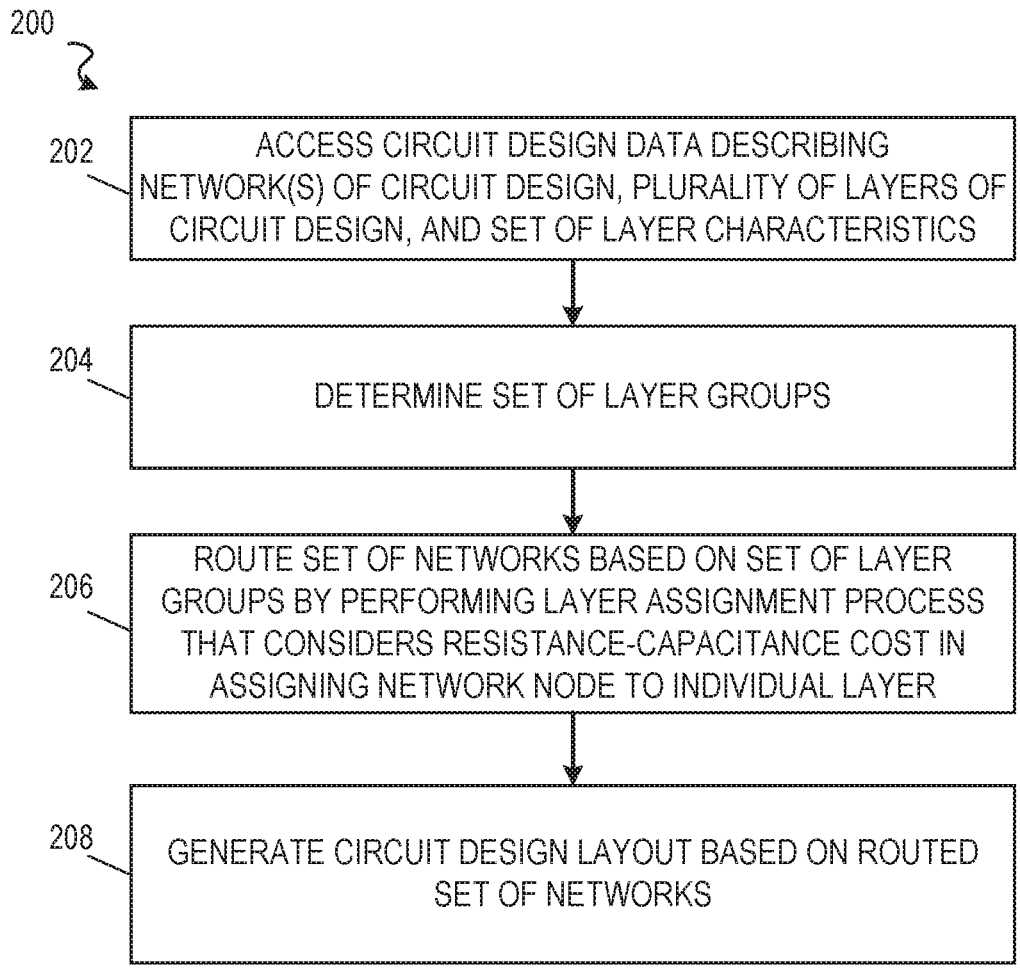
FIGS. 2 through 5 are flowcharts illustrating example methods for layer assignment of a network of a circuit design based on a resistance characteristic or a capacitance characteristic, according to some embodiments.

Referring now to FIG. 2, the flowchart illustrates the example method 200 for layer assignment of a network of a circuit design based on a resistance characteristic or a capacitance characteristic, according to some embodiments. For some embodiments, one or more operations of the method 200 are performed as part of a global routing process performed with respect to a circuit design (e.g., by an EDA software system). An operation of the method 200 (or another method described herein) may be performed by a hardware processor (e.g., central processing unit or graphics processing unit) of a computing device (e.g., desktop, server, etc.).

As illustrated, at operation 202, circuit design data is accessed, where the design data describes a set of networks of a circuit design, describes a plurality of layers of the circuit design, and describes an individual set of layer characteristics for each individual layer in the plurality of layers. For some embodiments, each individual set of layer characteristics of a layer comprises a resistance characteristic and a capacitance characteristic.

Thereafter, at operation 204, a set of layer groups is determined. For some embodiments, a set of layer groups is determined by assigning each given layer, in the plurality of layers, to a given layer group of the set of layer groups based on the individual set of layer characteristics of the given layer. In doing so, the plurality of layers of a circuit design can be divided into layer groups based on layer characteristics (e.g., resistance-capacitance characteristics). For some embodiments, operation 204 comprises combining two neighboring layer groups in response to the resistance-capacitance characteristic being the same. Additionally, for some embodiments, operation 204 comprises: determining a characteristic difference value between a first layer group of the plurality of layer groups and a second layer group of the plurality of layer groups, where the second layer group neighbors the first layer group; determining whether the characteristic difference value surpasses a difference threshold; and, in response to determining that the characteristic difference value does not surpass the difference threshold, combining the first layer group and the second layer group. Depending on the embodiment, the difference threshold can comprise a value, which can be inputted or defined by a user (e.g., of an EDA system).

For some embodiments, the layer assignment process that considers the resistance-capacitance (RC) cost comprises determining a potential resistance-capacitance cost of assigning a node of a network (network node) to each available layer in a set of available layers for the network node (e.g., available layers in the layer range of a current layer group). For a particular available layer and a preferred layer specified by a user (e.g., of an EDA system), the potential resistance-capacitance cost of assigning the network node to the available layer can comprise a difference of at least one of a resistance characteristic or a capacitance characteristic between the particular available layer and the preferred layer. Subsequently, various embodiments select a given available layer, in the set of available layers, as the individual layer based on the potential resistance-capacitance cost of assigning the network node to the given available layer. For instance, the given available layer having a lowest/minimum determined cost can be selected as the individual layer for the network node.

Depending on the embodiment, a potential via cost, a potential congestion cost, or both can also be determined (in addition to the potential resistance-capacitance cost) for assigning the network node to each available layer in a set of available layers for the network node. Accordingly, an embodiment can select a given available layer, in the set of available layers, as the individual layer based on the potential resistance-capacitance cost of assigning the network node to the given available layer, and further based on the potential via cost of assigning the network node to the given available layer or the potential congestion cost of assigning the network node to the given available layer. In doing so, various embodiments can route networks (non-routed networks) that remain unrouted (i.e., non-routed networks) after routing has been attempted on each network in a layer group using a layer range of the layer group.

Operation 206 routes the set of networks based on the set of layer groups (determined by operation 204), where the routing comprises performing a layer assignment process that considers a resistance-capacitance cost in assigning a network node to an individual layer (e.g., an available layer within a layer range of a given layer group). The resistance-capacitance cost can represent a difference of a resistance characteristic or a capacitance characteristic between two layers (e.g., a preferred layer for assignment and an available layer for assignment). For instance, routing the set of networks based on the set of layer groups can comprise routing a first subset of networks (of the set of networks), where the first subset of networks is associated with a first layer group from the set of layer groups, and where routing the first subset of networks comprises performing the layer assignment process (described above) on the first subset of networks using a first layer range provided by the first layer group. This can be repeated for another subset of networks (of the set of networks) associated with another layer group from the set of layer groups. For instance, the routing the set of networks based on the set of layer groups can comprise routing a first subset of networks (of the set of networks), where the second subset of networks is associated with a second layer group from the set of layer groups, and where routing the second subset of networks comprises performing the layer assignment process (described above) on the second subset of networks using a second layer range provided by the second layer group.

For various embodiments, routing the set of networks based on the set of layer groups can comprise routing a first subset of networks (of the set of networks) by enlarging a layer range for assigning nodes of a given network, of the first subset of networks, to include a set of neighboring layers, and routing the given network based on the enlarged layer range, where enlarging the layer range is based on at least one of a resistance characteristic or a capacitance characteristic of the set of neighboring layers. Depending on the embodiment, the enlargement of the layer range can occur with respect to the given network in response to the given network not being able to be successfully routed within a layer range of the layer group applicable to the given network (e.g., layer range of the first layer group where the given network is one of the networks associated with the first layer group).

To route an individual network (e.g., from a subnet of networks associated with a layer group), some embodiments generate a two-dimensional routing topology of the individual network and perform layer assignment on the individual network based on the generated two-dimensional routing topology. The two-dimensional routing topology of the individual network can comprise a set of nodes of the individual network, where the set of nodes can form the individual network two-dimensionally. Accordingly, performing layer assignment on the individual network (based on the generated two-dimensional routing topology) comprises considering a resistance-capacitance cost in assigning a network node of the two-dimensional routing topology to an individual layer based on the given layer group.

Subsequently, the method 200 continues with operation 208 generating a circuit design layout based on the routed (by operation 206) set of networks. In comparison to the conventional methodologies for layer assignment, the circuit design generated by operation 208 can have improved timing and improved layer adherence.

Figure 3:
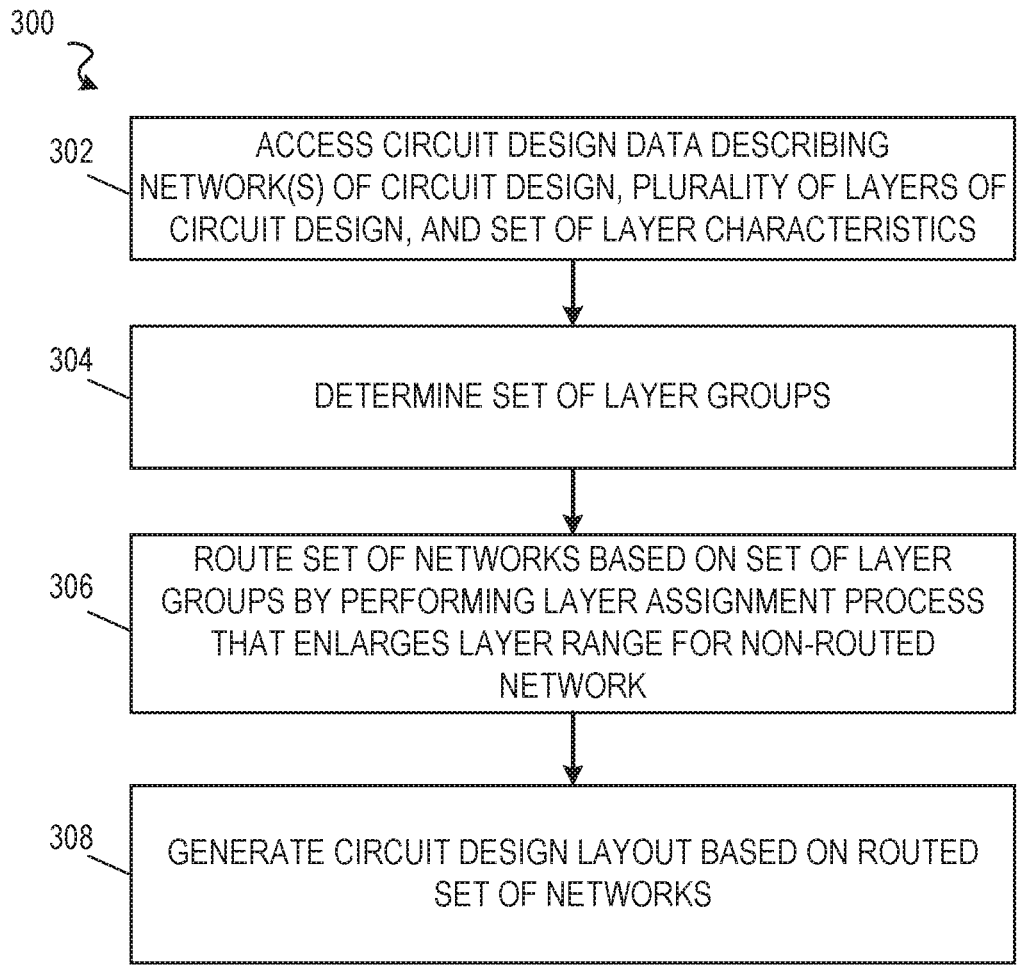

Referring now to FIG. 3, the flowchart illustrates the example method 300 for layer assignment of a network of a circuit design based on an enlarged layer range, according to some embodiments. For some embodiments, one or more operations of the method 300 are performed as part of a global routing process performed with respect to a circuit design (e.g., by an EDA software system). For some embodiments, operations 302 and 304 are similar to operations 202 and 204 described above with respect to the method 200 of FIG. 2.

Operation 306 routes the set of networks based on the set of layer groups (determined by operation 304), where the routing comprises performing a layer assignment process that enlarges a layer range for a non-routed network. For some embodiments, for a non-routed network associated with a given layer group, a layer range for the non-routed network is enlarged based on at least one of a resistance characteristic or a capacitance characteristic of an individual layer that neighbors the given layer group. For instance, with respect to each given subset of networks associated with a given layer group, some embodiments can route the given subset of networks based on a layer range of the given layer group, and determine whether a set of non-routed networks remains in the given subset of networks. In response to determining that a set of non-routed networks remains in the given subset of networks, various embodiments can route the set of non-routed networks based on an enlarged layer range. The enlarged layer range can be produced by enlarging a layer range for assigning nodes of the given network to include a set of neighboring layers based on at least one of a resistance characteristic or a capacitance characteristic of the set of neighboring layers. In response to determining that a set of non-routed networks does not remain in the given subset of networks, various embodiments can repeat operations with respect to another subset of networks (associated with another layer group).

Subsequently, the method 300 continues with operation 308 generating a circuit design layout based on the routed set of networks (routed by operation 306). In comparison to the conventional methodologies for layer assignment, the circuit design generated by operation 308 can have improved timing and improved layer adherence.

Figure 4:
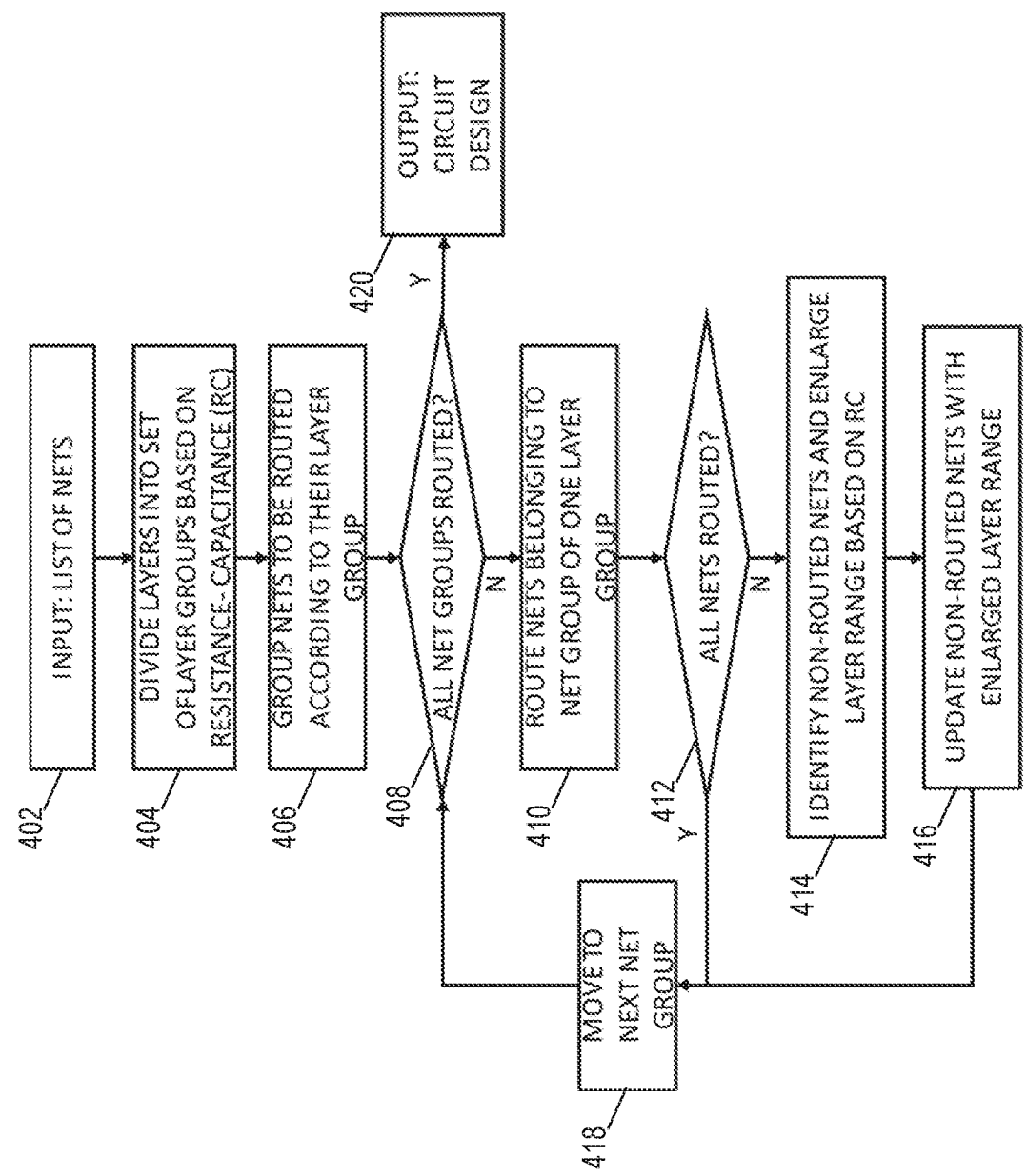

Referring now to FIG. 4, the flowchart illustrates the example method 400 for layer assignment of a network of a circuit design based on layer groupings, according to some embodiments. For some embodiments, one or more operations of the method 400 are performed as part of a global routing process performed with respect to a circuit design (e.g., by an EDA software system).

As shown, at operation 402, a list of networks (nets) of a circuit design are used as input and, at operation 404, layers of the circuit design are divided into a set of layer groups based on (e.g., according to) resistance-capacitance (RC) characteristics of the layers. Thereafter, at operation 406, nets of the circuit design to be routed are grouped (into network groups or net groups) according to their respective layer group. In response to determining at operation 408 that all the net groups (generated by operation 406) have not been routed, the method 400 proceeds to operation 410; otherwise, the method 400 proceeds to operation 420.

At operation 410, one or more nets belonging to a (current) net group of one-layer group are routed. For some embodiments, these one or more nets are routed using a layer range associated with the one-layer group. In response to determining at operation 412 that all of the one or more nets have not been routed, the method 400 proceeds to operation 414; otherwise, the method 400 proceeds to operation 418. At operation 418, the method 400 moves to the next net group (generated by operation 406) that is associated with a next layer group (generated by operation 404). If none remain, the method 400 proceeds to operation 420.

Operation 414 identifies one or more nets, from the net group, that did not successfully route during operation 410. During operation 410, routing was attempted on these one or more identified nets (hereafter, non-routed nets) using the layer range associated with the one-layer group. During operation 414, the non-routed nets can have their original layer range enlarged (beyond that of the one-layer group) based on a resistance-capacitance characteristic of a neighboring layer. For example, based on resistance-capacitance characteristic of one or more layers neighboring the one-layer group, some embodiments can enlarge the layer range to include those one or more neighboring layers for the non-routed nets. Subsequently, at operation 416, routing is reperformed on the one or more non-routed nets using the enlarged layer provided by operation 414, thereby updating the one or more non-routed nets with the enlarged layer. Routing demands will also be updated when the non-routed nets are updated so that the routed nets can be kept.

Eventually, operation 420 outputs a circuit design based on all the routed net groups. According to various embodiments, in comparison to traditional layer assignment methodologies, the outputted circuit design has improved timing, improved layer adherence, or both.

Figure 5:
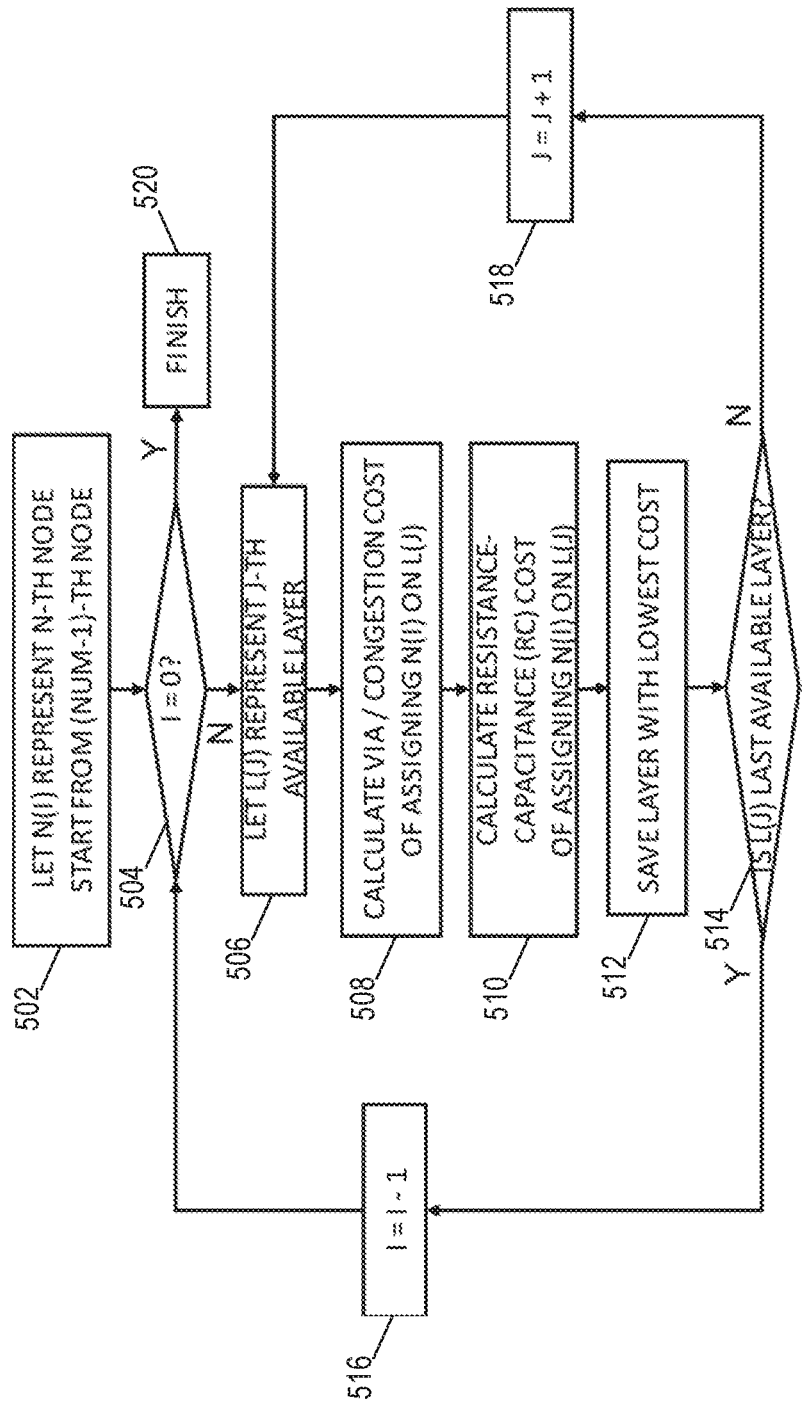

Referring now to FIG. 5, the flowchart illustrates the example method 500 for layer assignment of a network of a circuit design based on resistance-capacitance cost (RC), according to some embodiments. For some embodiments, one or more operations of the method 500 are performed as part of a global routing process performed with respect to a circuit design (e.g., by an EDA software system).

As shown, at operation 502, the method 500 starts from last node, where I=number of nodes−1, and where N(I) represents the Nth node of a network of a circuit design layer assigned. In response to I=0 at operation 504, the method 500 proceeds to operation 520; otherwise, the method 500 proceeds to operation 506. The method 500 is completed/finished at operation 520.

At operation 506, the Jth layer of a circuit design is set to be represented by L(J). Operation 508 calculates a via cost, a congestion cost, or both, for assigning node N(I) on layer L(J), while operation 510 calculates a resistance-capacitance (RC) cost of assigning node N(I) on layer L(J). For some embodiments, the RC cost of assigning node N(I) on layer L(J) can be equal to the RC difference of layer L(J) and a preferred layer specified by a user (e.g., via an EDA system). Thereafter, operation 512 saves the assignment of node N(I) on layer L(J) if it has the lowest combined cost observed so far. In response to layer L(J) being the last available layer at operation 514, the method 500 proceeds to operation 516, which decrements I by 1 and returns back to operation 504. In doing so, the method 500 can consider the layer assignment of the next node of the network. In response to layer L(J) not being the last available layer at operation 514, the method 500 proceeds to operation 518, which increments J by 1 and returns back to operation 506. In doing so, the method 500 can consider the next available layer for the current node N(I). As a result of the method 500, each node of the network can be assigned to an available layer such that via, congestion, and RC costs are minimized.

Figure 6:
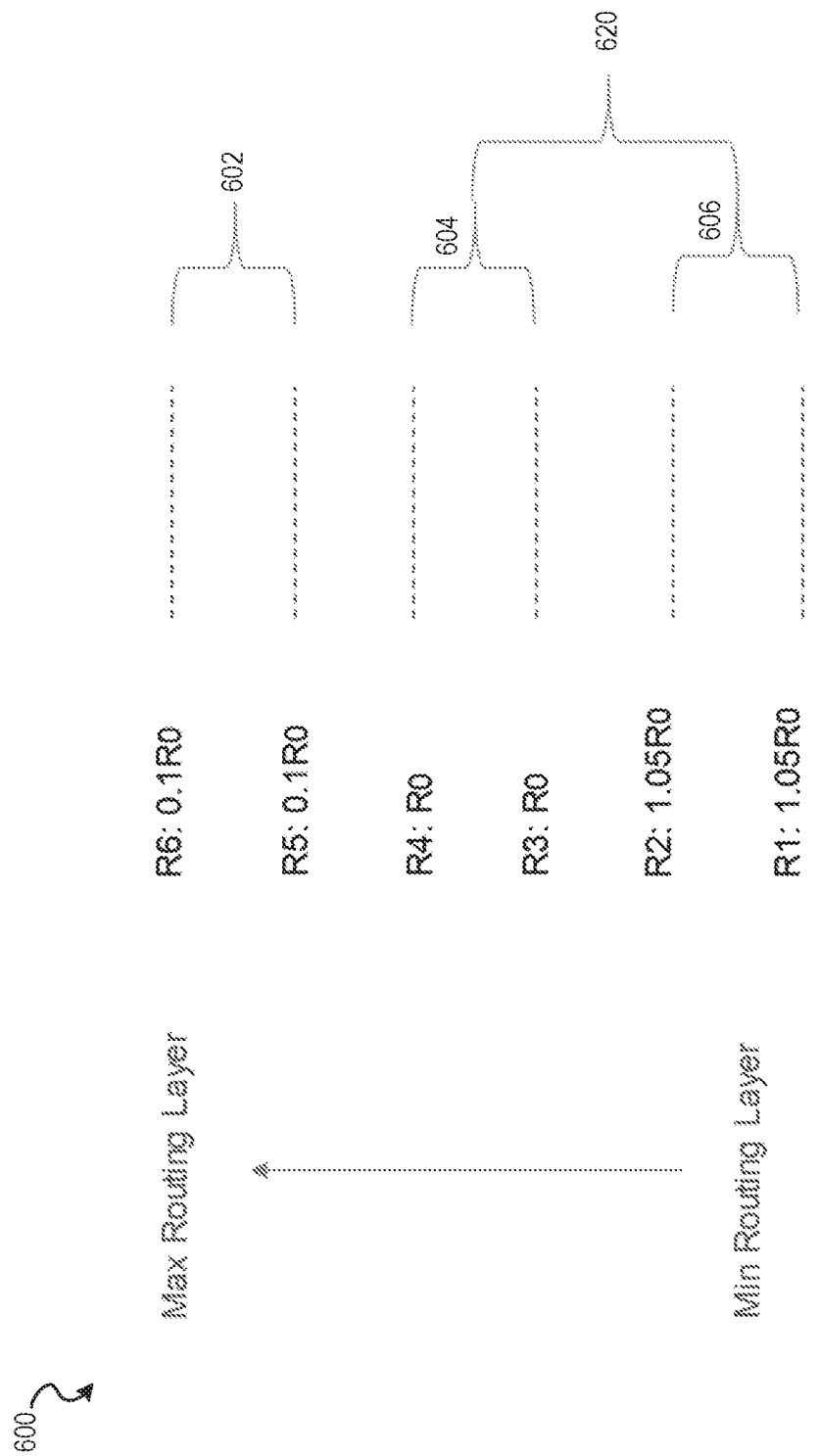
FIG. 6 is a diagram illustrating an example of grouping layers, according to some embodiments.

FIG. 6 is a diagram illustrating an example of grouping layers 600, according to some embodiments. In FIG. 6, R1 can correspond to the resistance-capacitance characteristic of the minimum routing layer (metal layer M1) of the circuit design and R6 can correspond to resistance-capacitance characteristic of the maximum routing layer (metal layer M6) of the circuit design. As shown, the resistance-capacitance characteristic R3 of metal layer M3 is $R_0$ and the resistance-capacitance characteristic R4 of metal layer M4 is also $R_0$. The resistance-capacitance characteristic R6 of metal layer M6 is 0.1 times $R_0$, the resistance-capacitance characteristic R5 of metal layer M5 is 0.1 times $R_0$, the resistance-capacitance characteristic R2 of metal layer M2 is 1.05 times $R_0$, and the resistance-capacitance characteristic R1 of metal layer M1 is 1.05 times $R_0$.

Based on the resistance-capacitance characteristics of neighboring layers/layer groups, some embodiments divide the metal layers M1 through M6 into layer groups by: combining neighboring layers/layer groups that have the same resistance-capacitance characteristics (e.g., RC values) into a single layer group; and for neighboring layers/layer groups that have different resistance-capacitance characteristics, checking the difference between the layers/layer groups, and combining neighboring layers/layer groups into a single layer group if the difference (e.g., the maximum difference) does not surpass a difference threshold. For some embodiments, the layer group generation process starts by assigning each layer into its own single layer group, and then combining layer groups as described herein. Accordingly, as shown, metal layers M5 and M6 can be combined into a single layer group 602, metal layers M4 and M3 can be combined into a single layer group 604, and metal layers M1 and M2 can be combined into a single layer group 606. As also shown, where the difference resistance-capacitance characteristic between $R_0$ and $1.05R_0$ is less than a difference threshold, the layer groups 604 and 606 can be combined into a single layer group 620.

Figure 7:
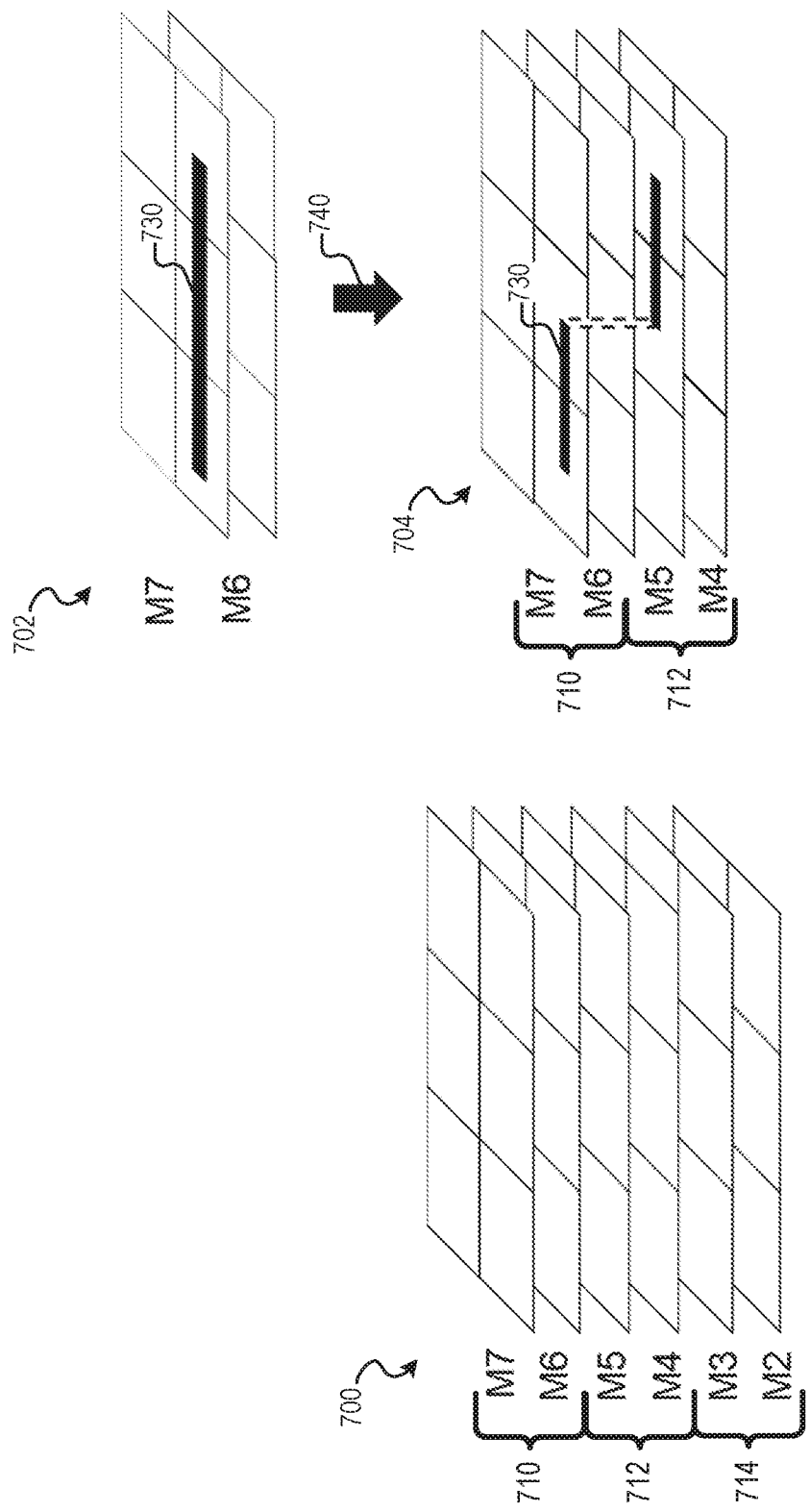
FIG. 7 is a diagram illustrating an example of layer groups and an example of layer assignment of a network of a circuit design based on enlarging a layer range based on a resistance characteristic or a capacitance characteristic, according to some embodiments.

FIG. 7 is a diagram illustrating an example of layer groups 700 and an example of layer assignment 704 of a network 730 of a circuit design based on enlarging a layer range based on a resistance characteristic or a capacitance characteristic, according to some embodiments. As shown, the layer groups 700 comprise a layer group 710 that includes metal layers M6 and M7, a layer group 712 that includes metal layers M4 and M5, and a layer group 714 that includes metal layers M2 and M3. As described herein, the layer groups 700 can be formed based on the resistance-capacitance characteristics (e.g., value) of the metal layers M2 through M7.

With respect to enlargement of a layer range, layer assignment 702 illustrates how the network 730 can be layer assigned to a single layer (metal layer M7) due to inadequate capacity, which can render it unrouteable using a layer range of the single layer group 710. In response to the network 730 not being able to be routed using a layer range of the single layer group 710, some embodiments enlarge 740 the layer range of the network 730 to include one or more layers from a neighboring layer group (e.g., 712), thereby resulting in the network 730 being layer assigned across layer groups 710 and 712 (specifically on metal layers M7 and M5 using a via) as shown.

Figure 8:
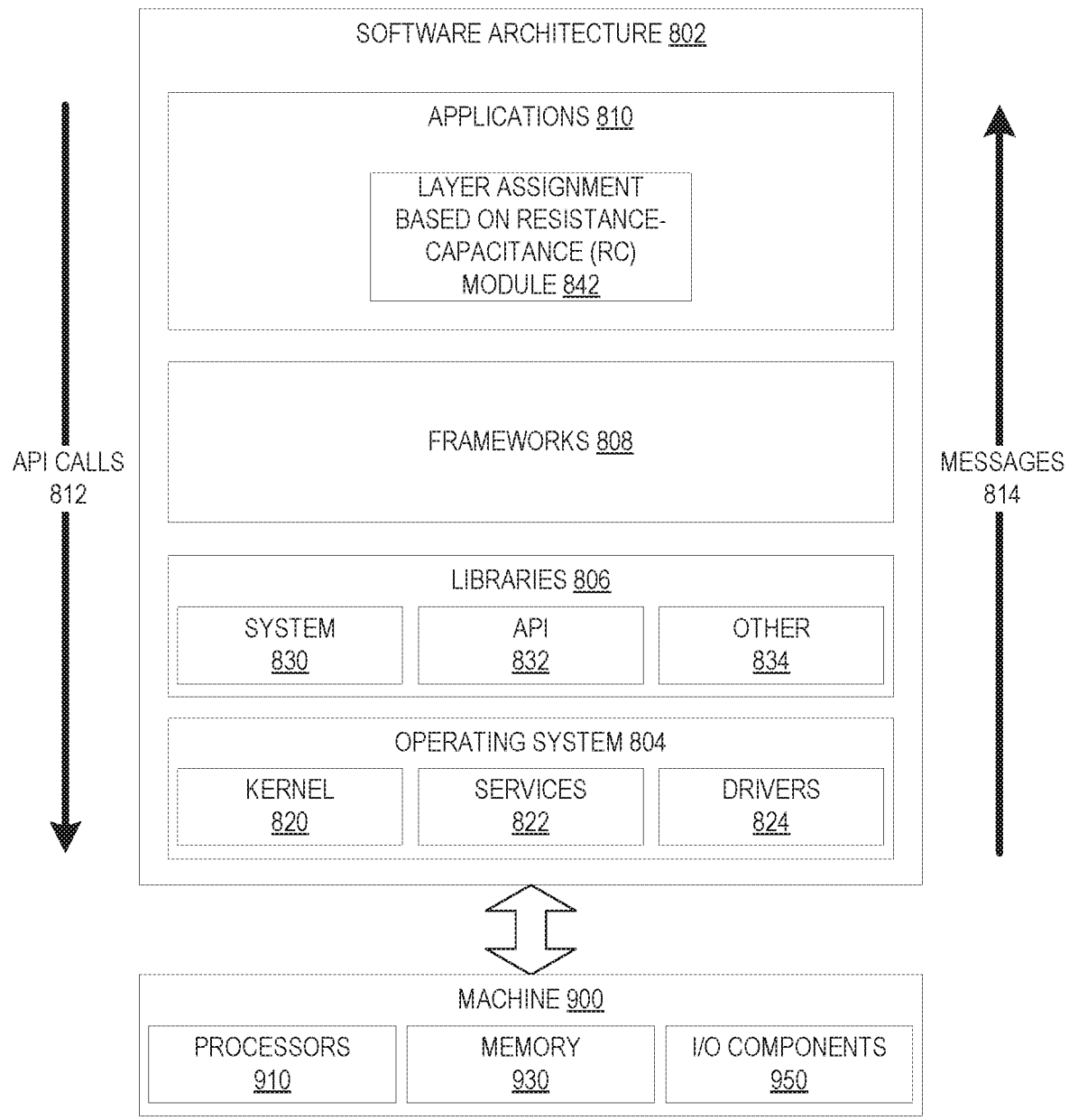
FIG. 8 is a block diagram illustrating an example of a software architecture that may be operating on an EDA computing device and may be used with methods for layer assignment of a network of a circuit design based on a resistance characteristic or a capacitance characteristic, according to some embodiments.

FIG. 8 is merely a non-limiting example of a software architecture 802, and it will be appreciated that many other architectures can be implemented to facilitate the functionality described herein. In various embodiments, the software architecture 802 is implemented by hardware such as a machine 900 of FIG. 9 that includes processors 910 (e.g., hardware processors), memory 930, and input/output (I/O) components 950. In this example, the software architecture 802 can be conceptualized as a stack of layers where each layer may provide a particular functionality. For example, the software architecture 802 includes layers such as an operating system 804, libraries 806, software frameworks 808, and applications 810. Operationally, the applications 810 invoke application programming interface (API) calls 812 through the software stack and receive messages 814 in response to the API calls 812, consistent with some embodiments. In various embodiments, any client device, any server computer of a server system, or any other device described herein may operate using elements of the software architecture 802. An EDA computing device described herein may additionally be implemented using aspects of the software architecture 802, with the software architecture 802 adapted for to perform layer assignment in any manner described herein.

In some embodiments, an EDA application of the applications 810 performs layer assignment of a network of a circuit design based on a resistance characteristic or a capacitance characteristic according to embodiments described herein using various modules within the software architecture 802. For example, in some embodiments, an EDA computing device similar to the machine 900 includes the memory 930 and the one or more processors 910. The processors 910 also implement a layer assignment based on resistance-capacitance (RC) module 842 (hereafter, the layer assignment module 842) for layer assignment of a network of a circuit design based on a resistance characteristic or a capacitance characteristic, in accordance with various embodiments described herein.

In various other embodiments, rather than being implemented as modules of the one or more applications 810, the layer assignment module 842 may be implemented using elements of the libraries 806, the operating system 804, or the software frameworks 808.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, signal-processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 806 provide a low-level common infrastructure utilized by the applications 810. The libraries 806 can include system libraries 830 such as libraries of blocks for use in an EDA environment or other libraries that can provide functions such as memory allocation functions, string manipulation functions, mathematic functions, and the like. In addition, the libraries 806 can include API libraries 832 such as media libraries (e.g., libraries to support presentation and manipulation of various media formats such as Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 806 may also include other libraries 834.

The software frameworks 808 provide a high-level common infrastructure that can be utilized by the applications 810, according to some embodiments. For example, the software frameworks 808 provide various graphic user interface (GUI) functions, high-level resource management, high-level location services, and so forth. The software frameworks 808 can provide a broad spectrum of other APIs that can be utilized by the applications 810, some of which may be specific to a particular operating system 804 or platform. In various embodiments, the systems, methods, devices, and instructions described herein may use various files, macros, libraries, and other elements of an EDA design environment to implement layer assignment of a network of a circuit design based on a resistance characteristic or a capacitance characteristic as described herein. This includes analysis of input design files for an integrated circuit design, along with any element of hierarchical analysis that may be used as part of or along with the embodiments described herein. While netlist files, library files, SDC files, and view definition files are examples that may operate within the software architecture 802, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner, in various embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose hardware processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 900 including processors 910), with these operations being accessible via a network (e.g., the Internet) and via one or more appropriate interfaces (e.g., an API), In certain embodiments, for example, a client device may relay or operate in communication with cloud computing systems and may access circuit design information in a cloud environment.

The performance of certain of the operations may be distributed among the processors, not only residing within a single machine 900, but deployed across a number of machines 900. In some embodiments, the processors 910 or processor-implemented modules are located in a single geographic location (e.g., within a home environment, an office environment, or a server farm). In some other embodiments, the processors or processor-implemented modules are distributed across a number of geographic locations.

Figure 9:
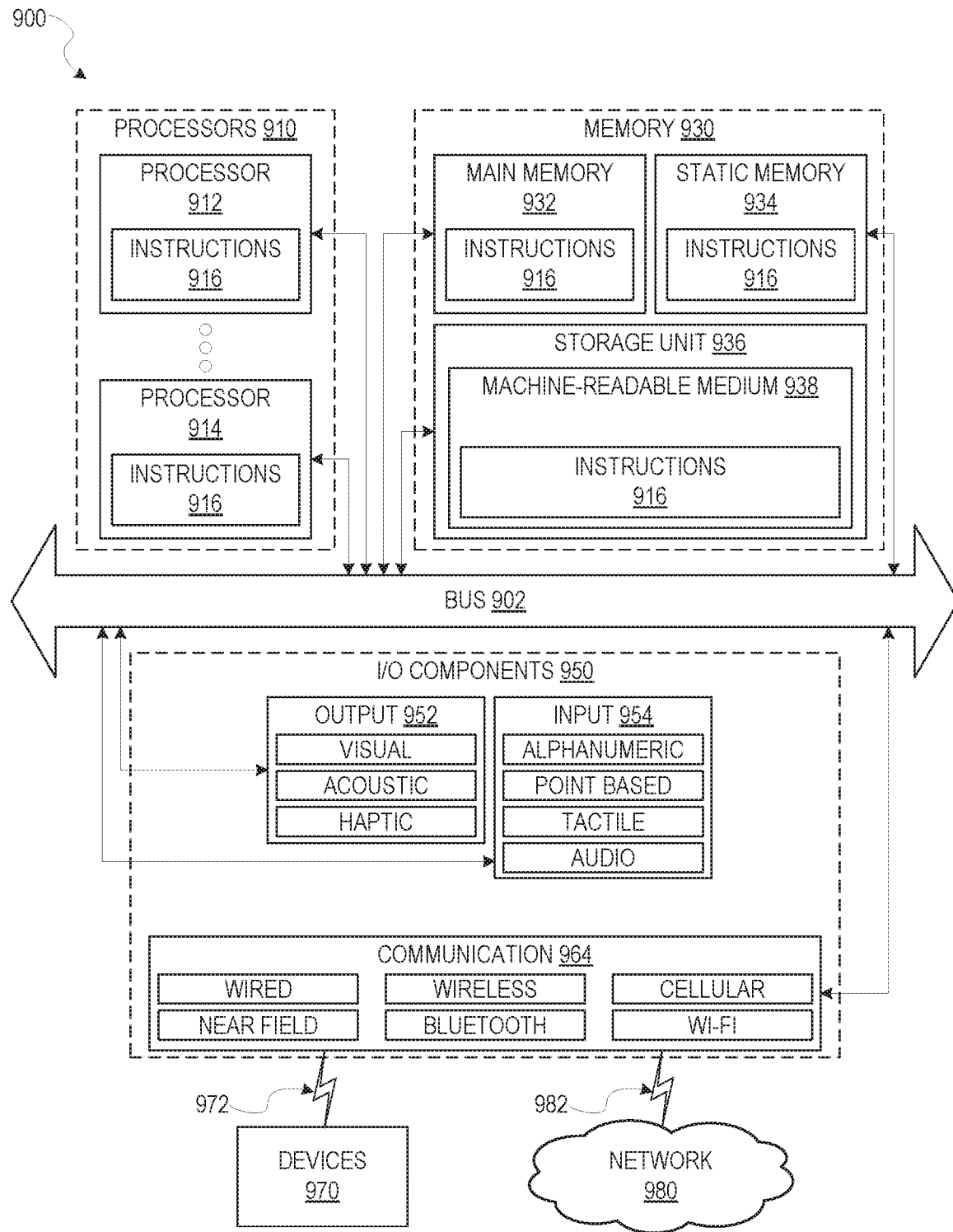
FIG. 9 is a diagram representing a machine in the form of a computer system within which a set of instructions are executed, causing the machine to perform any one or more of the methods discussed herein, according to some embodiments.

FIG. 9 is a diagrammatic representation of the machine 900 in the form of a computer system within which a set of instructions may be executed for causing the machine 900 to perform any one or more of the methodologies discussed herein, according to some embodiments. FIG. 9 shows components of the machine 900, which is, according to some embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein can be executed. In alternative embodiments, the machine 900 operates as a standalone device or can be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

In various embodiments, the machine 900 comprises processors 910, memory 930, and I/O components 950, which can be configured to communicate with each other via a bus 902, In some embodiments, the processors 910 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another, or any suitable combination thereof) include, for example, a processor 912 and a processor 914 that may execute the instructions 916. The term "processor" is intended to include multi-core processors 910 that may comprise two or more independent processors 912, 914 (also referred to as "cores") that can execute the instructions 916 contemporaneously. Although FIG. 9 shows multiple processors 910, the machine 900 may include a single processor 912 with a single core, a single processor 912 with multiple cores (e.g., a multi-core processor 912), multiple processors 910 with a single core, multiple processors 910 with multiple cores, or any combination thereof.

The memory 930 comprises a main memory 932, a static memory 934, and a storage unit 936 accessible to the processors 910 via the bus 902, according to some embodiments. The storage unit 936 can include a machine-readable medium 938 on which are stored the instructions 916 embodying any one or more of the methodologies or functions described herein. The instructions 916 can also reside, completely or at least partially, within the main memory 932, within the static memory 934, within at least one of the processors 910 (e.g., within the processor's cache memory), or any suitable combination thereof, during execution thereof by the machine 900. Accordingly, in various embodiments, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown, in some embodiments, to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., the instructions 916) for execution by a machine (e.g., the machine 900), such that the instructions, when executed by one or more processors of the machine (e.g., the processors 910), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 can include many other components that are not shown in FIG. 9. The I/O components 950 are grouped according to functionality merely for simplifying the following discussion, and the grouping is in no way limiting. In various embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow, or outputs for circuit fabrication. As described herein, "constraints," "requirements," "design elements," and other aspects of a circuit design refer to selectable values that are set as part of the design of a circuit. Such design constraints, requirements, or elements may be adjusted by a system operator or circuit designer to suit the particular goals of a project or circuit that results from the operations described herein.

Communication can be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, the communication components 964 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 970 may be another machine or any of a wide variety of peripheral devices (e.g., a peripheral device coupled via a USB).

In various embodiments, one or more portions of the network 980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling.

Furthermore, the machine-readable medium 938 is non-transitory (in other words, not having any transitory signals) in that it does not embody a propagating signal. However, labeling the machine-readable medium 938 "non-transitory" should not be construed to mean that the machine-readable medium 938 is incapable of movement; the machine-readable medium 938 should be considered as being transportable from one physical location to another. Additionally, since the machine-readable medium 938 is tangible, the machine-readable medium 938 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to some embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method comprising:
   accessing, by a hardware processor, circuit design data that describes a set of networks of a circuit design, that describes a plurality of layers of the circuit design, and that describes an individual set of layer characteristics for each individual layer in the plurality of layers, each individual set of layer characteristics comprising a resistance characteristic and a capacitance characteristic;
   determining, by the hardware processor, a set of layer groups by assigning each given layer, in the plurality of layers, to a given layer group of the set of layer groups based on the individual set of layer characteristics of the given layer;
   routing, by the hardware processor, the set of networks based on the set of layer groups, the routing the set of networks based on the set of layer groups comprising:
      routing a first subset of the set of networks associated with a first layer group from the set of layer groups, the routing the first subset of networks comprising performing a layer assignment process on the first subset of networks using a first layer range provided by the first layer group, the layer assignment process considering a resistance-capacitance cost in assigning a network node to an individual layer, the resistance-capacitance cost representing a difference of at least one of a resistance characteristic or a capacitance characteristic between two layers, the layer assignment process comprising:
         for each available layer in a set of available layers for the network node, determining a potential resistance-capacitance cost of assigning the network node to the available layer; and
         selecting a given available layer, in the set of available layers, as the individual layer based on the potential resistance-capacitance cost of assigning the network node to the given available layer; and
   generating, by the hardware processor, a circuit design layout based on the routed set of networks.

2. The method of claim 1, wherein the routing the set of networks based on the set of layer groups further comprises:
   routing a second subset of the set of networks associated with a second layer group from the set of layer groups, the routing the second subset of networks comprising performing the layer assignment process on the second subset of networks using a second layer range provided by the second layer group.

3. The method of claim 1, wherein the assigning each given layer, in the plurality of layers, to the given layer group of the set of layer groups based on the individual set of layer characteristics of the given layer comprises:
   determining a characteristic difference value between a first layer group of the plurality of layer groups and a second layer group of the plurality of layer groups, the second layer group neighboring the first layer group;
   determining whether the characteristic difference value surpasses a difference threshold; and
   combining the first layer group and the second layer group in response to determining that the characteristic difference value does not surpass the difference threshold.

4. The method of claim 1, wherein the routing the first subset of networks further comprises:
   enlarging a layer range for assigning nodes of a given network, of the first subset of networks, to include a set of neighboring layers, the enlarging the layer range being based on at least one of a resistance characteristic or a capacitance characteristic of the set of neighboring layers; and
   routing the given network based on the enlarged layer range.

5. The method of claim 1, wherein the potential resistance-capacitance cost of assigning the network node to the available layer comprises a difference of at least one of a resistance characteristic or a capacitance characteristic between the available layer and a preferred layer specified by a user.

6. The method of claim 1, wherein the layer assignment process further comprises:
   for each available layer in the set of available layers for the network node, determining a potential via cost for assigning the network node to the available layer, the selecting the given available layer as the individual layer further based on the potential via cost of assigning the network node to the given available layer.

7. The method of claim 1, wherein the layer assignment process further comprises:
   for each available layer in the set of available layers for the network node, determining a potential congestion cost of assigning the network node to the available layer, the selecting the given available layer as the individual layer further based on the potential congestion cost of assigning the network node to the given available layer.

8. A device comprising:
   a memory storing instructions; and
   a hardware processor communicatively coupled to the memory and configured by the instructions to perform operations comprising:
      accessing circuit design data that describes a set of networks of a circuit design, that describes a plurality of layers of the circuit design, and that describes an individual set of layer characteristics for each individual layer in the plurality of layers, each individual set of layer characteristics comprising a resistance characteristic and a capacitance characteristic;
      determining a set of layer groups by assigning each given layer, in the plurality of layers, to a given layer group of the set of layer groups based on the individual set of layer characteristics of the given layer;
      routing the set of networks based on the set of layer groups, the routing the set of networks based on the set of layer groups comprising:
         routing a first subset of the set of networks associated with a first layer group from the set of layer groups, the routing the first subset of networks comprising performing a layer assignment process on the first subset of networks using a first layer range provided by the first layer group, the layer assignment process considering a resistance-capacitance cost in assigning a network node to an individual layer, the resistance-capacitance cost representing a difference of at least one of a resistance characteristic or a capacitance characteristic between two layers, the layer assignment process comprising:
            for each available layer in a set of available layers for the network node, determining a potential resistance-capacitance cost of assigning the network node to the available layer; and
            selecting a given available layer, in the set of available layers, as the individual layer based on the potential resistance-capacitance cost of
assigning the network node to the given available layer; and generating a circuit design layout based on the routed set of networks.

9. The device of claim 8, wherein the routing the set of networks based on the set of layer groups further comprises:
routing a second subset of the set of networks associated with a second layer group from the set of layer groups, the routing the second subset of networks comprising performing the layer assignment process on the second subset of networks using a second layer range provided by the second layer group.

10. The device of claim 8, wherein the assigning each given layer, in the plurality of layers, to the given layer group of the set of layer groups based on the individual set of layer characteristics of the given layer comprises:
determining a characteristic difference value between a first layer group of the plurality of layer groups and a second layer group of the plurality of layer groups, the second layer group neighboring the first layer group;
determining whether the characteristic difference value surpasses a difference threshold; and
combining the first layer group and the second layer group in response to determining that the characteristic difference value does not surpass the difference threshold.

11. The device of claim 8, wherein the routing the first subset of networks further comprises:
enlarging a layer range for assigning nodes of a given network, of the first subset of networks, to include a set of neighboring layers, the enlarging the layer range being based on at least one of a resistance characteristic or a capacitance characteristic of the set of neighboring layers; and
routing the given network based on the enlarged layer range.

12. The device of claim 8, wherein the potential resistance-capacitance cost of assigning the network node to the available layer comprises a difference of at least one of a resistance characteristic or a capacitance characteristic between the available layer and a preferred layer specified by a user.

13. The device of claim 8, wherein the layer assignment process further comprises:
for each available layer in the set of available layers for the network node, determining a potential via cost for assigning the network node to the available layer, the selecting the given available layer as the individual layer further based on the potential via cost of assigning the network node to the given available layer.

14. The device of claim 8, wherein the layer assignment process further comprises:
for each available layer in the set of available layers for the network node, determining a potential congestion cost of assigning the network node to the available layer, the selecting the given available layer as the individual layer further based on the potential congestion cost of assigning the network node to the given available layer.

15. A non-transitory computer-readable medium comprising instructions that, when executed by a hardware processor of a device, cause the device to perform operations comprising:
accessing circuit design data that describes a set of networks of a circuit design, that describes a plurality of layers of the circuit design, and that describes an individual set of layer characteristics for each individual layer in the plurality of layers, each individual set of layer characteristics comprising a resistance characteristic and a capacitance characteristic;
determining a set of layer groups by assigning each given layer, in the plurality of layers, to a given layer group of the set of layer groups based on the individual set of layer characteristics of the given layer;
routing the set of networks based on the set of layer groups, the routing the set of networks based on the set of layer groups comprising:
routing a first subset of the set of networks associated with a first layer group from the set of layer groups, the routing the first subset of networks comprising performing a layer assignment process on the first subset of networks using a first layer range provided by the first layer group, the layer assignment process considering a resistance-capacitance cost in assigning a network node to an individual layer, the resistance-capacitance cost representing a difference of at least one of a resistance characteristic or a capacitance characteristic between two layers, the layer assignment process comprising:
for each available layer in a set of available layers for the network node, determining a potential resistance-capacitance cost of assigning the network node to the available layer; and
selecting a given available layer, in the set of available layers, as the individual layer based on the potential resistance-capacitance cost of assigning the network node to the given available layer; and
generating a circuit design layout based on the routed set of networks.

16. The non-transitory computer-readable medium of claim 15, wherein the routing the set of networks based on the set of layer groups further comprises:
routing a second subset of the set of networks associated with a second layer group from the set of layer groups, the routing the second subset of networks comprising performing the layer assignment process on the second subset of networks using a second layer range provided by the second layer group.

17. The non-transitory computer-readable medium of claim 15, wherein the assigning each given layer, in the plurality of layers, to the given layer group of the set of layer groups based on the individual set of layer characteristics of the given layer comprises:
determining a characteristic difference value between a first layer group of the plurality of layer groups and a second layer group of the plurality of layer groups, the second layer group neighboring the first layer group;
determining whether the characteristic difference value surpasses a difference threshold; and
combining the first layer group and the second layer group in response to determining that the characteristic difference value does not surpass the difference threshold.

18. The non-transitory computer-readable medium of claim 15, wherein the routing the first subset of networks further comprises:
enlarging a layer range for assigning nodes of a given network, of the first subset of networks, to include a set of neighboring layers, the enlarging the layer range being based on at least one of a resistance characteristic or a capacitance characteristic of the set of neighboring layers; and
routing the given network based on the enlarged layer range.

19. The non-transitory computer-readable medium of claim 15, wherein the potential resistance-capacitance cost of assigning the network node to the available layer comprises a difference of at least one of a resistance characteristic or a capacitance characteristic between the available layer and a preferred layer specified by a user.

* * * * *